United States Patent [19]

Ooki et al.

[11] Patent Number: 5,033,822

[45] Date of Patent: Jul. 23, 1991

[54] LIQUID CRYSTAL APPARATUS WITH TEMPERATURE COMPENSATION CONTROL CIRCUIT

[75] Inventors: Akiko Ooki, Atsugi; Akira Tsuboyama, Sagamihara; Hiroshi Inoue, Yokohama, all of Japan

[73] Assignee: Canon Kabushiki Kaisha, Tokyo, Japan

[21] Appl. No.: 392,010

[22] Filed: Aug. 10, 1989

[30] Foreign Application Priority Data

Aug. 17, 1988 [JP] Japan ................. 63-205068

[51] Int. Cl.$^5$ .............................................. G02F 1/13
[52] U.S. Cl. ................. 350/331 T; 350/332; 350/333; 340/784
[58] Field of Search ............. 350/332, 331 T, 331 R, 350/350 S, 333; 340/784

[56] References Cited

U.S. PATENT DOCUMENTS

| | | | |
|---|---|---|---|
| 4,319,237 | 3/1982 | Matsuo et al. | 340/713 |
| 4,367,924 | 1/1983 | Clark et al. | 350/334 |
| 4,548,476 | 10/1985 | Kaneko | 350/350 S |
| 4,563,059 | 1/1986 | Clark et al. | 350/350 S X |
| 4,639,089 | 1/1987 | Okada et al. | 350/341 |
| 4,655,561 | 4/1987 | Kanbe et al. | 350/350 S |
| 4,674,839 | 6/1987 | Tsuboyama et al. | 350/334 |
| 4,682,858 | 7/1987 | Kanbe et al. | 350/334 |
| 4,697,887 | 10/1987 | Okada et al. | 350/350 S |
| 4,709,994 | 12/1987 | Kanbe et al. | 350/350 S |
| 4,709,995 | 12/1987 | Kuribayashi et al. | 350/350 S |
| 4,712,872 | 12/1987 | Kanbe et al. | 350/333 |
| 4,712,873 | 12/1987 | Kanbe et al. | 350/337 |
| 4,712,874 | 12/1987 | Sekimura et al. | 350/339 |
| 4,712,875 | 12/1987 | Tsuboyama et al. | 350/344 |
| 4,712,877 | 12/1987 | Okada et al. | 350/350 S |
| 4,714,323 | 12/1987 | Katagiri et al. | 350/350 S |
| 4,747,671 | 5/1988 | Takahashi et al. | 350/336 |
| 4,902,107 | 2/1990 | Tsuboyama et al. | 350/350 S |
| 4,923,285 | 5/1990 | Ogino et al. | 350/331 T |
| 4,952,032 | 8/1990 | Inoue et al. | 350/350 S |

Primary Examiner—Stanley D. Miller
Assistant Examiner—Ron Trice
Attorney, Agent, or Firm—Fitzpatrick, Cella, Harper & Scinto

[57] ABSTRACT

A liquid crystal apparatus is provided a liquid crystal display comprising scanning electrodes, data electrodes disposed opposite to and intersecting with the scanning electrodes so as to form an electrode matrix, and a ferroelectric liquid crystal disposed between the scanning electrodes and data electrodes. A first circuit is further provided for applying a scanning selection signal having a duration of one scanning selection period 1H to the scanning electrodes and applying data signals to the data electrodes in synchronism with the scanning selection signal so as to apply a drive voltage having an amplitude $V_{OP}$ to the liquid crystal. A control circuit controls the first circuit so as to change the one scanning selection period 1H by a change $\Delta 1H$ and the drive voltage amplitude $V_{OP}$ by a change $\Delta V_{OP}$ corresponding to a change in ambient temperature, the changes $\Delta 1H$ and $\Delta V_{OP}$ satisfying the following formula (1):

$$-0.8 \geq \Delta \log 1H / \Delta \log V_{OP} \geq -1.4 \tag{1},$$

wherein $\Delta \log 1H^1 = \log(1H_1 + \Delta 1H) - \log 1H$, and $\Delta \log V_{OP} = \log(V_{OP1} + \Delta V_{OP}) - \log V_{OP1}$, $1H_1$ being one scanning selection period before the change, $V_{OP1}$ being the drive voltage amplitude before the change.

12 Claims, 5 Drawing Sheets

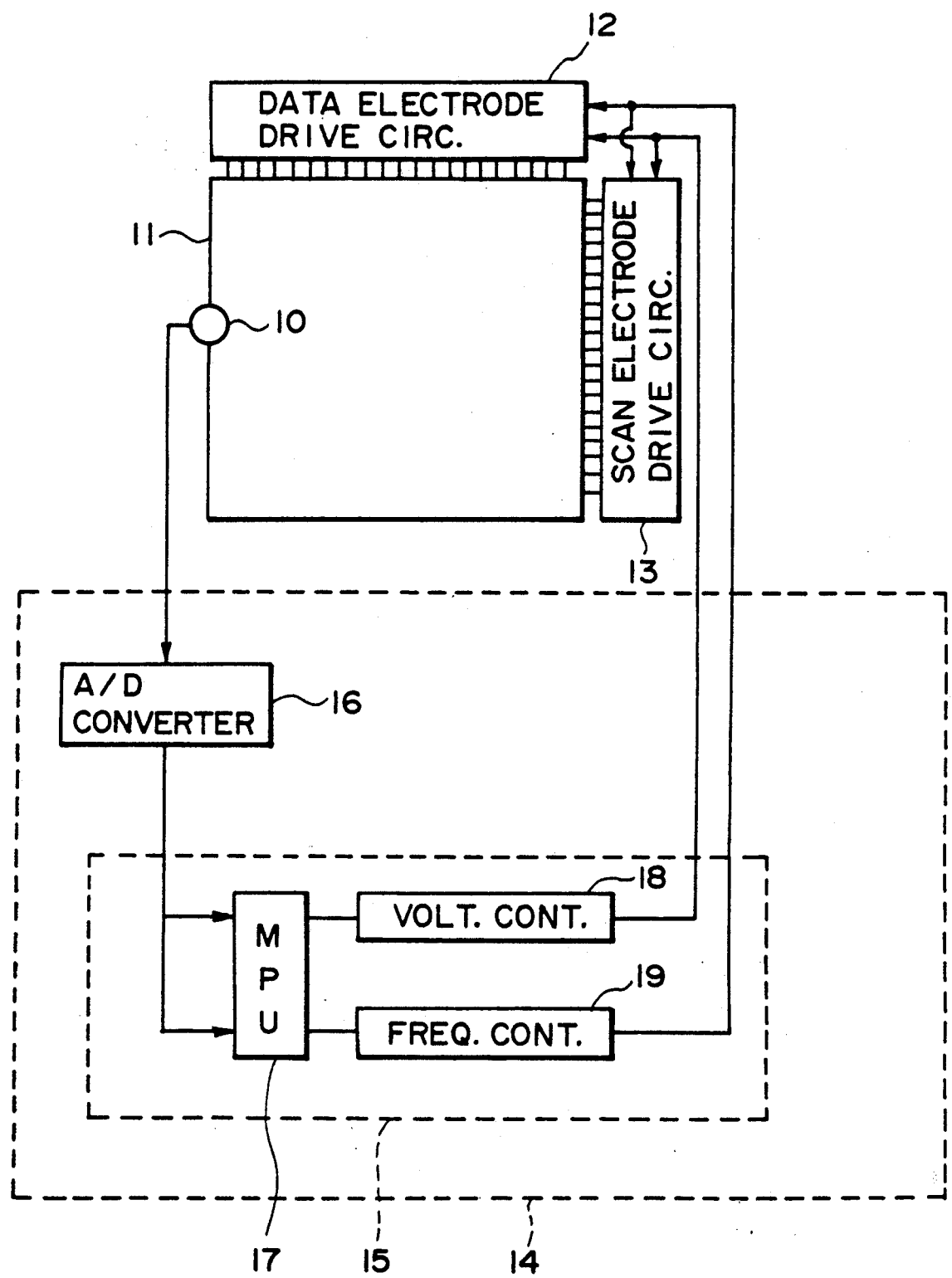
F I G. 1

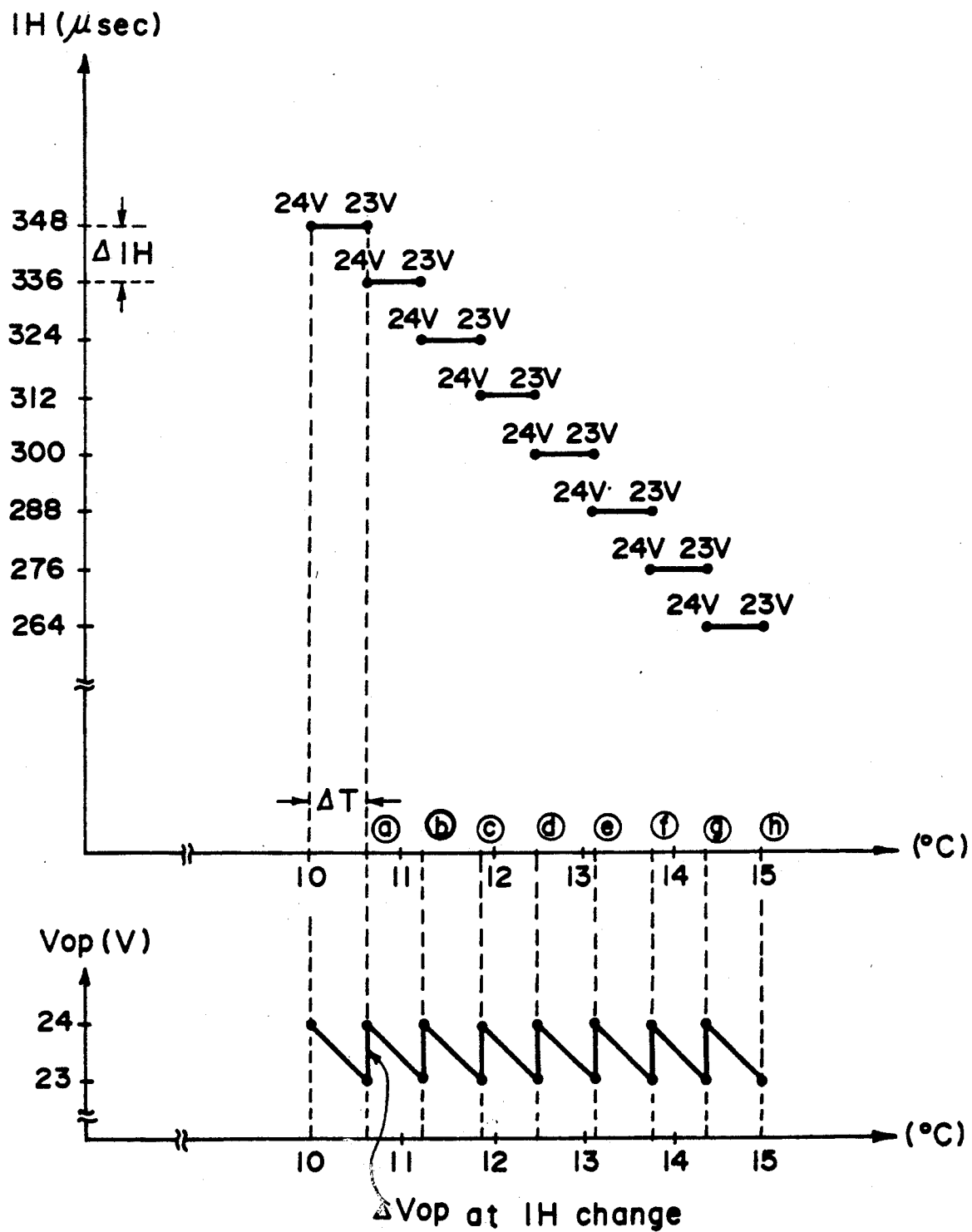
F I G. 4

LIQUID CRYSTAL APPARATUS WITH TEMPERATURE COMPENSATION CONTROL CIRCUIT

FIELD OF THE INVENTION AND RELATED ART

The present invention relates to a liquid crystal apparatus, particularly one using a ferroelectric liquid crystal.

Clark and Lagerwall have disclosed a surface-stabilized bistable ferroelectric liquid crystal in Applied Physics Letters, Vol. 36, No. 11 (June 1, 1980), pp. 899-901, and U.S. Pat. Nos. 4,367,924 and 4,563,059. The bistable ferroelectric liquid crystal has been realized by disposing a chiral smectic liquid crystal between a pair of substrates which are set to provide a spacing small enough to suppress the formation of a helical arrangement of liquid crystal molecules inherent to the bulk chiral smectic phase of the liquid crystal and aligning vertical molecular layers each composed of a plurality of liquid crystal molecules in one direction.

A liquid crystal apparatus comprising such a ferroelectric liquid crystal may be driven by a multiplexing drive scheme as disclosed by, e.g., U.S. Pat. No. 4,655,561 to Kanbe, et al., to provide a display with a large number of pixels.

In order to drive such a liquid crystal apparatus in an ordinary temperature range, it is necessary to change one scanning selection period (1H) and the peak value of a drive voltage ($V_{OP}$) corresponding to a change in ambient temperature. In cases where the ambient temperature is changed to a lower temperature, for example, it has been necessary to set a longer one scanning selection period (1H) and a higher drive voltage peak value ($V_{OP}$). Further, in actual temperature compensation through such modulation of one scanning selection period (1H) and drive voltage amplitude ($V_{OP}$), it has been necessary to set a stepwise temperature change ($\Delta T$) depending on factors such as a liquid crystal cell and a time set of a micro-computer used and to set a stepwise change ($\Delta T$) of the one scanning selection period (1H) and a stepwise change ($\Delta V_{OP}$) of the drive voltage amplitude ($V_{OP}$) depending on the stepwise temperature change ($\Delta T$).

According to our experiments, when the drive of a liquid crystal apparatus was continued under new drive conditions including addition of a change ($\Delta 1H$) in one scanning selection period (1H) and a change ($\Delta V_{OP}$) in drive voltage peak value ($V_{OP}$) corresponding to a change ($\Delta T$) in ambient temperature (i.e., under drive conditions varied corresponding to an ambient temperature change), there was observed a contrast change on a display at the time of changing the drive conditions. According to our further experiments, because of insufficient accuracy of a thermistor used as a temperature sensor, a change ($\Delta 1H$) in one scanning selection period (1H) and a change ($\Delta V_{OP}$) in drive voltage amplitude ($V_{OP}$) were miscalculated in spite of the absence of a temperature change ($\Delta T$), so that there was caused a contrast change on a display to finally result in a periodical change in contrast caused by a periodical change in such drive conditions.

SUMMARY OF THE INVENTION

An object of the present invention is to provide a liquid crystal apparatus not having a contrast change and flickering, occurring in a drive mode using temperature compensation as described above.

According to the present invention, there is provided a liquid crystal apparatus, comprising:

(a) a liquid crystal device comprising scanning electrodes, data electrodes disposed opposite to and intersecting with the scanning electrodes so as to form an electrode matrix, and a ferroelectric liquid crystal disposed between the scanning electrodes and data electrodes, (b) first means for applying a scanning selection signal having a duration of one scanning selection period 1H to the scanning electrodes and applying data signals to the data electrodes in synchronism with the scanning selection signal so as to apply a drive voltage having an amplitude $V_{OP}$ to the liquid crystal, and (c) control means for controlling the first means so as to change the one scanning selection period 1H by a change $\Delta 1H$ and the drive voltage amplitude $V_{OP}$ by a change $\Delta V_{OP}$ corresponding to a change in ambient temperature, the changes $\Delta 1H$ and $\Delta V_{OP}$ satisfying the following formula (1):

$$-0.8 \geq \Delta\log 1H / \Delta\log V_{OP} \geq -1.4 \quad (1),$$

wherein $\Delta\log 1H = \log(1H_1 + \Delta 1H) - \log 1H_1$, and $\Delta\log V_{OP} = \log(V_{OP1} + \Delta V_{OP}) - \log V_{OP1}$, $1H_1$ being one scanning selection period before the change, $V_{OP1}$ being the drive voltage amplitude before the change.

More specifically, by adopting the above-mentioned apparatus being driven according to a specific temperature compensation scheme, it has been found possible to remove or suppress a contrast change and occurrence of flickering caused by changes in one scanning selection period and drive voltage corresponding to a change in ambient temperature.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 1 is a block diagram of an apparatus according to the present invention.

FIGS. 4 and 5 are diagrams showing relationships among a temperature change, a change in one scanning selection period and a change in drive voltage peak value.

DESCRIPTION OF THE PREFERRED EMBODIMENTS

Figure 2:
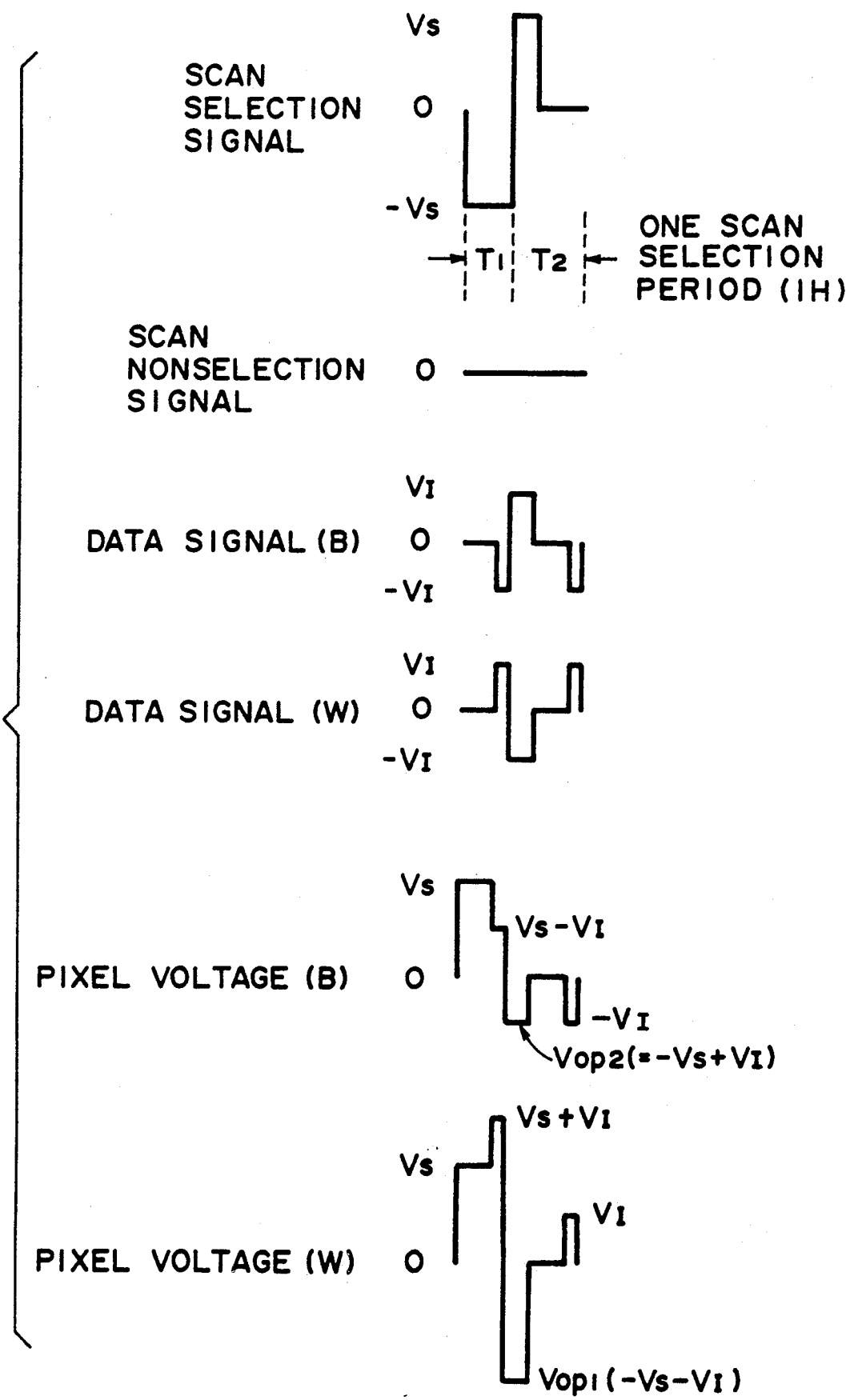
FIG. 2 is a waveform diagram showing a set of driving waveforms used in the present invention.

FIG. 1 is a block diagram of a liquid crystal apparatus according to the present invention. Referring to FIG. 1, the liquid crystal apparatus comprises a ferroelectric liquid crystal panel 11 which in turn comprises a matrix electrode structure composed of scanning electrodes and data electrodes and a ferroelectric liquid crystal disposed between the scanning electrodes and data electrodes (detailed structure not shown), a data electrode drive circuit 12, and a scanning electrode drive circuit 13. The liquid crystal apparatus is further equipped with a temperature sensor 10 (of, e.g., a thermistor) for detecting an ambient temperature and outputting a voltage within a prescribed range (e.g., 2.5 V–0 V for a temperature range of 0° C.–60° C.). The voltage value output from the temperature sensor 10 is subjected to digital conversion into a corresponding number of bits by an A/D converter 16 in a liquid crystal panel control circuit 14, and the number of bits is read and judged by an MPU (micro-processor unit) 17 in a drive waveform generation control unit 15. The resultant signal from the MPU 17 may be supplied to a voltage controller 18 and a frequency controller 19 to control output waveforms (one scanning selection period and drive voltage peak values) from the scanning electrode drive circuit 13 and the data electrode drive circuit 12.

The MPU 17 used in the present invention may control the scanning electrode drive circuit 13 and the data electrode drive circuit 12 so that an R value of ($\Delta$log 1H/$\Delta$log $V_{OP}$) may be within the range of $-0.8$ to $-1.4$ in cases where a change $\Delta$1H and a change $\Delta V_{OP}$ corresponding to a change in ambient temperature are defined by $\Delta$log 1H$=$log(1H$_1+\Delta$1H)$-$log 1H$_1$ and $\Delta$log $V_{OP}=$log($V_{OP1}+\Delta V_{OP}$)$-$log $V_{OP1}$.

FIG. 2 shows a set of drive voltage signal waveforms used in the present invention. In one scanning selection period, a scanning selection signal having alternating voltages $\pm V_S$ and a voltage O is applied to a scanning electrode, wherein the voltages $\pm V_S$ and the voltage O are values defined with reference to the voltage level of a scanning non-selection signal. The data electrodes are supplied with a black or white data signal depending on given data. In this embodiment, the pixels on a scanning electrode supplied with a scanning selection signal are simultaneously erased into a black state in a period $T_1$ during one scanning selection period, and then in a subsequent period $T_2$, a pixel supplied with a data signal (B) is set to a black state and a pixel supplied with a data signal (W) is set to a white state.

In the apparatus of the present invention, temperature compensation may be effected by modulating (changing) the length of one scanning selection period (1H) and the magnitude of a drive voltage peak value $V_{OP}$ (capable of writing in black or white) which is $V_{OP1}$ or $V_{OP2}$ giving a maximum value during the period $T_2$.

Figure 3:
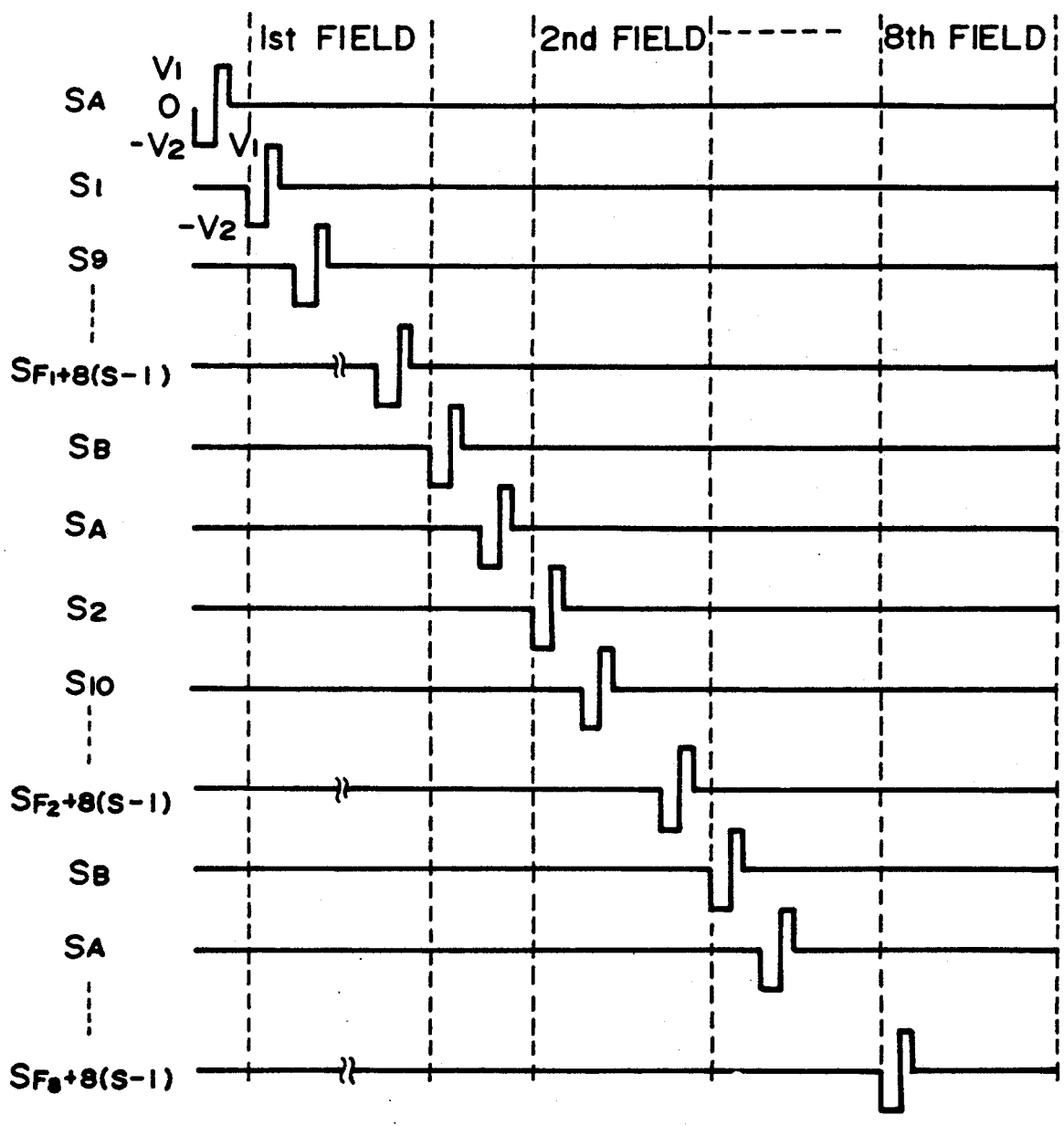
FIG. 3 is a diagram showing a sequence of application of a scanning selection signal.

FIG. 3 is a waveform diagram showing an example of a sequence of applying a scanning selection signal shown in FIG. 2 to the scanning electrodes. According to the scanning sequence shown in FIG. 3, a scanning selection signal is sequentially applied to the scanning electrodes $S_1$, $S_2$, ..., $S_{F8+8(s-1)}$ every 8th electrode (7 electrodes apart) in one vertical scanning (field scanning) and one picture is formed through 8 times of field scanning to complete one frame scanning. In this instance, in each field scanning, the scanning selection signal is also applied to the scanning electrodes $S_A$ and $S_B$ in the non-display region. In FIG. 3, the symbols $F_1$, $F_2$, ..., $F_8$ each represent an ordinal number of field scanning in one frame scanning and the symbol s represents an ordinal number of scanning in one field scanning.

A series of experiments were conducted wherein the above-mentioned display operation was repeated by using a ferroelectric liquid crystal panel with the dimensions and drive conditions as shown below and the driving signal waveforms shown in FIGS. 2 and 3 while applying the scanning selection signal to the scanning electrodes 7 electrodes apart (in every 8-th electrode).

Ferroelectric liquid crystal panel

Number of scanning electrodes: 400

Number of data electrodes: 640
Ferroelectric liquid crystal: "CS-1017" (trade name available from Chisso K. K.)
Peak values of signals, $\pm V_S=\pm 15$ volts
$\pm V_I=\pm 5$ volts
One scanning selection period (1H): shown in FIG. 4
Drive voltage peak value $V_{OP}$: shown in FIG. 4 (for $V_{OP1}$)
Temperature: 10° C.–15° C.

FIG. 4 shows values of one scanning selection period 1H ($\mu$sec) and drive voltage peak values $V_{OP}$(for $V_{OP1}$) versus the ambient temperature which varied from 10° to 15° C. As shown in FIG. 4, when the temperature change $\Delta$T was an increase or decrease by 0.625° C., the change $\Delta$1H in one scanning selection period 1H was set to $\pm 12$ $\mu$sec and the change $\Delta V_{OP}$ in drive voltage peak value $V_{OP}$ (with respect to $V_{OP1}$) was set to $\pm 1$ V$=\pm (24$ V$-23$ V). Actually, an abrupt temperature change did not occur, the resultant drive voltage including a change $\Delta V_{OP}$ at the change of one scanning selection period 1H was gradually restored to the original peak value $V_{OP}$ in a number of frame scanning (e.g., 5–20 frames). As shown in FIG. 4, when the ambient temperature was changed from 10° C. to 10° C.$+0.625$° C., for example, the one scanning selection period 1H was changed from 348 $\mu$sec to 336 $\mu$sec and the drive voltage peak value $V_{OP}$ was changed from 23 V to 24 V, and then the drive voltage peak value $V_{OP}$ was controlled to be restored to the original value of 23 V in a number of frame scannings. In the embodiment shown in FIG. 4, the R value was set to the range of $-0.8$ to $-1.4$, and no flickering was observed due to a contrast change caused by a malfunction of a thermistor or an increase or decrease in ambient temperature.

The R values at temperature-changing points a – h in FIG. 4 were as follows.

| Points | Temperature (°C.) | R-value |
|--------|-------------------|---------|
| a | 10 + 0.625 | −0.82 |
| b | 10 + 2 × 0.625 | −0.85 |
| c | 10 + 3 × 0.625 | −0.89 |
| d | 10 + 4 × 0.625 | −0.92 |
| e | 10 + 5 × 0.625 | −0.96 |
| f | 10 + 6 × 0.625 | −1.00 |
| g | 10 + 7 × 0.625 | −1.04 |
| h | 10 + 8 × 0.625 | −1.09 |

Figure 5:
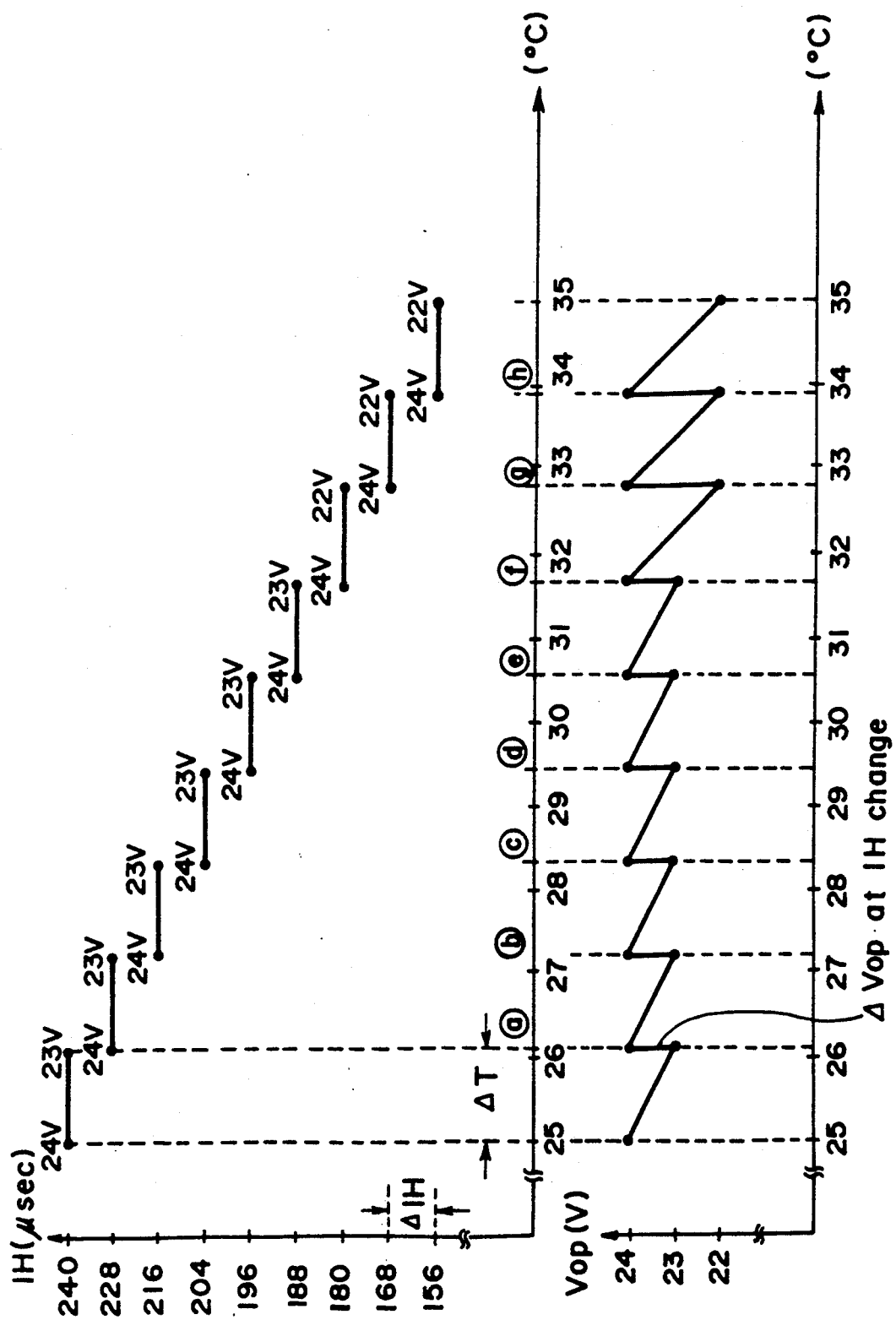

FIG. 5 shows another preferred embodiment of the present invention. In the embodiment shown in FIG. 5, temperature compensation was effected in the same manner as the above embodiment except that the one scanning selection period 1H was changed by 12 $\mu$sec or 8 $\mu$sec and the drive voltage peak value $V_{OP}$ was changed by 1 V or 2 V each time the temperature change $\Delta$T amounted to 1.2° C. The R value was set within the range of $-0.8$ to $-1.4$, and a display free from flickering was obtained.

The values at temperature-changing points a – h in FIG. 5 were as follows.

| Points | Temperature (°C.) | R-value |
|--------|-------------------|---------|
| a | 25 + 1.2 | −1.20 |
| b | 25 + 2 × 1.2 | −1.27 |
| c | 25 + 3 × 1.2 | −1.34 |
| d | 25 + 4 × 1.2 | −0.94 |
| e | 25 + 5 × 1.2 | −0.98 |
| f | 25 + 6 × 1.2 | −1.02 |
| g | 25 + 7 × 1.2 | −0.80 |

-continued

| Points | Temperature (°C.) | R-value |
|---|---|---|
| h | 25 + 8 × 1.2 | −0.85 |

Then, we made a series of drive tests wherein the ambient temperature was changed from 15° C. to 15° C.+25° C., the one scanning selection period 1H was changed from 480 μsec to 444 μsec (Δ1H=36 μsec), and the drive voltage peak value change was varied so as to provide R-values shown in the following Table 1, whereby the display image quality was checked with respect to flickering to obtain the following results.

TABLE 1

| R-value | Image quality (flickering) |
|---|---|
| −1.89 | x |
| −1.39 | o |
| −1.10 | o |
| −0.90 | o |
| −0.77 | Δ |

The image quality (flickering) on the display panel was evaluated by a panel comprising arbitrarily selected 20 panelists (operators). In Table 1, x denotes a case where 20-15 panelists recognized flickering; Δ, 14-6 panelists recognized flickering; and o, 20-15 panelists recognized no flickering. As shown in Table 1, in the case where the R-value was outside the range of −0.8 to −1.4, flickering occurred to provide a low display quality.

In the present invention, in addition to the specific driving embodiments describe above, there may also be applied driving schemes as disclosed in, e.g., U.S. Pat. Nos. 4,548,476, 4,655,561, 4,697,887, 4,709,995, 4,712,872 and 4,747,671. Further, the liquid crystal panel suitably used in the present invention may be a ferroelectric liquid crystal panel as disclosed in U.S. Pat. Nos. 4,639,089, 4,674,839, 4,682,858, 4,709,994, 4,712,873, 4,712,874, 4,712,875, 4,712,877 and 4,714,323.

As described above, according to the present invention, in a drive control system for driving a ferroelectric liquid crystal panel in a wide temperature range by switching or changing stepwise one scanning selection period and drive voltage peak value, it has become possible to suppress or remove flickering caused by a contrast change occurring at the time of switching or a contrast change due to malfunction of a thermistor thereby to provide an improved display quality.

What is claimed is:

1. A liquid crystal apparatus, comprising:
   (a) a liquid crystal device comprising scanning electrodes, data electrodes disposed opposite to and intersecting with said scanning electrodes so as to form an electrode matrix, and a ferroelectric liquid crystal disposed between said scanning electrodes and data electrodes;
   (b) first means for applying a scanning selection signal having a duration of one scanning selection period 1H to said scanning electrodes and applying data signals to said data electrodes in synchronism with the scanning selection signal so as to apply a drive voltage having an amplitude $V_{OP}$ to said liquid crystal; and
   (c) control means for controlling said first means so as to change the one scanning selection period 1H by a change $\Delta 1H$ and the drive voltage amplitude $V_{OP}$ by a change $\Delta V_{OP}$ corresponding to a change in ambient temperature, the changes $\Delta 1H$ and $\Delta V_{OP}$ satisfying the following formula (1):

$$-0.8 \geq \Delta\log 1H/\Delta\log V_{OP} \geq -1.4 \tag{1}$$

wherein $\Delta\log 1H = \log(1H_1 + \Delta 1H) - \log 1H_1$, and $\Delta\log V_{OP} = \log(V_{OP1} + \Delta V_{OP}) - \log V_{OP1}$, $1H_1$ being one scanning selection period before the change, $V_{OP1}$ being the drive voltage amplitude before the change.

2. An apparatus according to claim 1, wherein said control means includes means for re-setting the changed drive voltage amplitude caused by the change in temperature to the drive voltage amplitude before the change thereof due to the change in temperature after a prescribed number of vertical scanning operations.

3. An apparatus according to claim 1, wherein the magnitude of the change $\Delta 1H$ caused by a temperature change is preliminarily set for each prescribed temperature-changing point.

4. An apparatus according to claim 1, wherein the magnitude of the change $\Delta V_{OP}$ caused by a temperature change is preliminarily set for each prescribed temperature-changing point.

5. A liquid crystal apparatus, comprising:
   (a) a liquid crystal device comprising X scanning electrodes, Y data electrodes disposed intersecting said scanning electrodes to form an X-Y electrode matrix, and a ferroelectric liquid crystal disposed between said scanning electrodes and data electrodes, X and Y being positive integers;
   (b) scanning electrode drive means for applying a scanning selection signal having a duration of one scanning selection period 1H to said scanning electrodes N electrodes apart(N: a positive integer) in one vertical scanning and applying the scanning selection signal to said X scanning electrodes in N+1 times of vertical scanning;
   (c) data electrode drive means for applying data signals to said data electrodes in parallel and in synchronism with the scanning selection signal so as to apply a drive voltage having an amplitude $V_{OP}$ to said liquid crystal; and
   (d) control means for controlling said scanning electrode drive means and data electrode drive means so as to change the one scanning selection period 1H by a change $\Delta 1H$ and the drive voltage amplitude $V_{OP}$ by a change $\Delta V_{OP}$ corresponding to a change in ambient temperature, the changes $\Delta 1H$ and $\Delta V_{OP}$ satisfying the following formula (1):

$$-0.8 \geq \Delta\log 1H/\Delta\log V_{OP} \geq -1.4 \tag{1}$$

wherein $\Delta\log 1H = \log(1H_1 + \Delta 1H) - \log 1H_1$, and $\Delta\log V_{OP} = \log(V_{OP1} + \Delta V_{OP}) - \log V_{OP1}$, $1H_1$ being one scanning selection period before the change, $V_{OP1}$ being the drive voltage amplitude before the change.

6. An apparatus according to claim 5, wherein said control means includes means for re-setting the changed drive voltage amplitude caused by the change in temperature to the drive voltage amplitude before the change thereof due to the change in temperature after a prescribed number of vertical scanning operations.

7. An apparatus according to claim 5, wherein the magnitude of the change $\Delta 1H$ caused by a temperature change is preliminarily set for each prescribed temperature-changing point.

8. An apparatus according to claim 5, wherein the magnitude of the change $\Delta V_{OP}$ caused by a temperature change is preliminarily set for each prescribed temperature-changing point.

9. A liquid crystal apparatus, comprising:
(a) a liquid crystal device comprising scanning electrodes, data electrodes disposed intersecting said scanning electrodes to form an electrode matrix, and a ferroelectric liquid crystal disposed between said scanning electrodes and data electrodes;
(b) scanning electrode drive means for applying to a selected scanning electrode a scanning selection signal having a duration of one scanning selection period 1H and comprising a first voltage of one polarity and a second voltage of the other polarity with reference to the voltage level of a non-selected scanning electrode;
(c) data electrode drive means for applying, to a selected data electrode, a first voltage signal providing a first drive voltage causing one orientation state of the ferroelectric liquid crystal in combination with said voltage of one polarity and a second voltage signal providing a second drive voltage causing the other orientation state of the ferroelectric liquid crystal in combination with said voltage of the other polarity, and to a non-selected data electrode, a third voltage signal providing a third voltage causing the one orientation state of the ferroelectric liquid crystal in combination with said voltage of one polarity and a fourth voltage signal providing a fourth voltage not changing the orientation state of the ferroelectric liquid crystal; and
(d) control means for controlling said scanning electrode drive means and data electrode drive means so as to change the one scanning selection period 1H by a change $\Delta 1H$ and the first, second and third drive voltages by an amplitude change $\Delta V_{OP}$ corresponding to a change in ambient temperature satisfying the following formula (1):

$$-0.8 \geq \Delta\log 1H / \Delta\log V_{OP} \geq -1.4 \qquad (1),$$

wherein $\Delta\log 1H = \log(1H_1 + \Delta 1H) - \log 1H_1$, and $\Delta\log V_{OP} = \log(V_{OP1} + \Delta V_{OP}) - \log V_{OP1}$, $1H_1$ being one scanning selection period before the change, $V_{OP1}$ being the drive voltage amplitude before the change.

10. An apparatus according to claim 9, wherein said control means includes means for re-setting the changed drive voltage amplitude caused by the change in temperature to the drive voltage amplitude before the change thereof due to the change in temperature after a prescribed number of vertical scanning operations.

11. An apparatus according to claim 9, wherein the magnitude of the change $\Delta 1H$ caused by a temperature change is preliminarily set for each prescribed temperature-changing point.

12. An apparatus according to claim 9, wherein the magnitude of the change $\Delta V_{OP}$ caused by a temperature change is preliminarily set for each prescribed temperature-changing point.

* * * * *